United States Patent [19]

Schuster

[11] Patent Number: 4,820,390

[45] Date of Patent: Apr. 11, 1989

[54] APPARATUS AND METHOD FOR CONTINUOUS ELECTROCHEMICAL MACHINING OF STRIP MATERIAL

[75] Inventor: John E. Schuster, Flossmoor, Ill.

[73] Assignee: The Interlake Companies, Inc., Oak Brook, Ill.

[21] Appl. No.: 69,865

[22] Filed: Jul. 6, 1987

[51] Int. Cl.[4] .................. B23H 3/10; B23H 7/32; B23H 7/36

[52] U.S. Cl. .................. 204/129.5; 204/129.7; 204/129.65; 204/206; 204/237; 204/211; 204/225; 204/224 M

[58] Field of Search ............. 204/129.5, 129.65, 129.7, 204/206, 224 M, 225, 237, 207–211, 129.2

[56] References Cited

U.S. PATENT DOCUMENTS

| | | | |
|---|---|---|---|
| 2,725,352 | 11/1955 | Strobel | 204/129.1 |
| 3,305,470 | 2/1967 | Williams et al. | 204/225 X |
| 3,324,022 | 6/1967 | Keeleric | 204/224 M |
| 3,399,130 | 8/1968 | Lovekin | 204/206 |
| 3,414,501 | 12/1968 | Kruger | 204/206 |
| 3,471,385 | 10/1969 | Farrell | 204/129.65 |
| 3,753,878 | 8/1973 | Gosger | 204/129.1 |
| 3,779,877 | 12/1973 | Alwitt | 204/129.75 |
| 3,900,376 | 8/1975 | Copsey et al. | 204/211 X |
| 3,935,080 | 1/1976 | Gumbinner et al. | 204/129.1 X |
| 4,127,459 | 11/1978 | Jumer | 204/129.1 X |
| 4,214,961 | 7/1980 | Anthony | 204/129.1 X |
| 4,279,714 | 7/1981 | Arora et al. | 204/129.9 |
| 4,332,652 | 6/1982 | Arora et al. | 204/129.75 |
| 4,343,686 | 8/1982 | Hebert, Jr. et al. | 204/129.2 |
| 4,427,506 | 1/1984 | Nguyen et al. | 204/129.4 |

Primary Examiner—Donald R. Valentine
Attorney, Agent, or Firm—Emrich & Dithmar

[57] ABSTRACT

In an electrochemical machining system a continuous web metal is moved through a working region around a conductive roller in electrical contact therewith. Part-cylindrical cathodes are disposed coaxially with the roller a slight distance radially therefrom to define a working gap between the cathodes and the web. The positive and negative terminals of a DC source are respectively connected to the roller and the cathodes and an electrolyte fluid is injected under pressure through bores in the cathodes into the working gap and removed therefrom through other bores in the cathodes or establish a current flow between the web and the cathode for removing material from the former. Retainers confine the electrolyte emitting laterally from the working gap, and electrolyte falling vertically therefrom is collected in a basin. The speed of movement of the web around the roller may be varied as a function of the thickness of the machined web. Longitudinal grooves may be utilized on the cathodes to provide a longitudinal ribbed configuration in the machined web.

34 Claims, 7 Drawing Sheets

APPARATUS AND METHOD FOR CONTINUOUS ELECTROCHEMICAL MACHINING OF STRIP MATERIAL

BACKGROUND OF THE INVENTION

The present invention relates to electrochemical treatment of metals and, in particular, to electrochemical machining of continuous metal webs or strips. The invention has particular application to the formation of thin metal foils from metal webs.

Typically, continuous metal foils are formed from thicker-gauge metal webs by rolling, usually cold rolling. This technique works well for metals which have good elongation and which are not work-hardenable. But for certain metals, such as titanium, the formation of foils by rolling is extremely difficult, if not impossible. Foil may also be produced by vapor deposition or plating, but this process is extremely slow and is usually associated with special alloys or elements.

Electrochemical machining of metals is a well established technology, and is used extensively to machine and deburr metal parts. Electrochemical machining is, in principle, the reverse of electroplating. Typically, in electrochemical machining a metal workpiece, which acts as an anode, is mounted for connection with the positive terminal of a DC source, and working electrode or cathode is connected to the negative terminal of the DC source and is disposed closely adjacent to the workpiece. The opposed surfaces of the cathode and the workpiece define a processing gap into which a liquid electrolyte is supplied for establishing a current path between the cathode and the workpiece for electrochemically removing material from the workpiece. A continuous flow of electrolyte fluid is maintained through the working gap to carry away material removed from the workpiece.

In order to progressively remove material from the workpiece at an even rate, a narrow working gap of a substantially constant prescribed dimension must be maintained. Prior electrochemical machining systems are all batch process type systems, wherein one or perhaps several discrete workpieces are processed in a single batch operation, after which another batch is processed in a separate operation. In such batch processes, the working gap is maintained by feeding the working or tool electrode toward the workpiece at a substantially constant speed, which depends upon the rate of removal of material from the workpiece. Such batch type systems are not suitable for continuous treatment of web or strip material, such as for reducing the thickness thereof to form metal foils.

It is known to perform other types of electrochemical processing operations on continuous web material. Thus, continuous etching or graining of metal webs is known. In such systems the metal web is moved between electrodes immersed in an etching bath. Such a system is disclosed, for example, in U.S. Pat. No. 3,779,877, issued Dec. 18, 1973. But such etching techniques are not suitable for continuous electrochemical machining of web material. More particularly, the spacing of the electrodes from the metal web is not controlled to close tolerances, as is required for electrochemical machining. Furthermore, these systems utilize an essentially static electrolyte bath, and do not provide for the flow of electrolyte fluid through a working gap, which is necessary in electrochemical machining to assure transport of removed material from the working gap. Furthermore, it is a fundamental object of such etching systems to avoid any significant reduction in the thickness of the web material, which is the exact opposite of the intent in the electrochemical machining of webs, such as in the formation of reduced-thickness foil materials.

SUMMARY OF THE INVENTION

It is a general object of the present invention to provide an improved electrochemical machining system which avoids the disadvantages of prior systems while affording additional structural and operating advantages.

An important feature of the invention is the provision of an electrochemical machining method which permits continuous machining of a metal web.

In connection with the foregoing feature, it is another feature of the invention to provide a method of the type set forth, which provides for movement of the web continuously so as to maintain a fixed working gap between the web and a working electrode.

Another feature of the invention is the provision of a method of the type set forth which affords a high-pressure flow of electrolyte fluid through the working gap.

Another feature of the invention is the provision of a method which permits the formation of foils of metals, such as titanium, which are difficult if not impossible to work by known techniques.

Another feature of the invention is the provision of a method of the type set forth, which permits formation of a ribbed machined material.

In connection with the foregoing features, still another feature of the invention is the provision of apparatus for performing a method of the type set forth.

Certain of these and other features of the invention are attained by providing apparatus for continuous electrochemical machining of a metal web comprising: transport means for continuously moving the web through a working region, electrode means disposed at the working region a predetermined distance from the portion of the web disposed in the working region so as to establish a predetermined working gap between the electrode means and the portion of the web disposed in the working region, means for continuously flowing an electrolyte fluid through the working gap in contact with the electrode means and with the portion of the web disposed in the working region, and coupling means for connecting a source of electric current to the electrode means and to the portion of the web disposed in the working region for promoting a flow of current through the web and the electrolyte and the electrode means to effect electrochemical removal of material from the portion of the web disposed in the working region.

Other features of the invention are attained by providing a method for continuous electrochemical machining of a metal web comprising the steps of: moving the web continuously through a working region, disposing an electrode at the working region a predetermined distance from the portion of the web disposed in the working region so as to establish a working gap between the electrode and the portion of the web disposed in the working region, continuously flowing an electrolyte fluid through the working gap in contact with the electrode and with the portion of the web disposed in the working region, and applying a negative electrical potential to the electrode and a positive electrical potential to the portion of the web disposed in a working region for promoting a flow of direct current through the electrode and the electrolyte fluid and the portion of the web disposed in the working region to effect electrochemical removal of material from the portion of the web disposed in the working region.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

DESCRIPTION OF THE PREFERRED EMBODIMENTS

Figure 1:
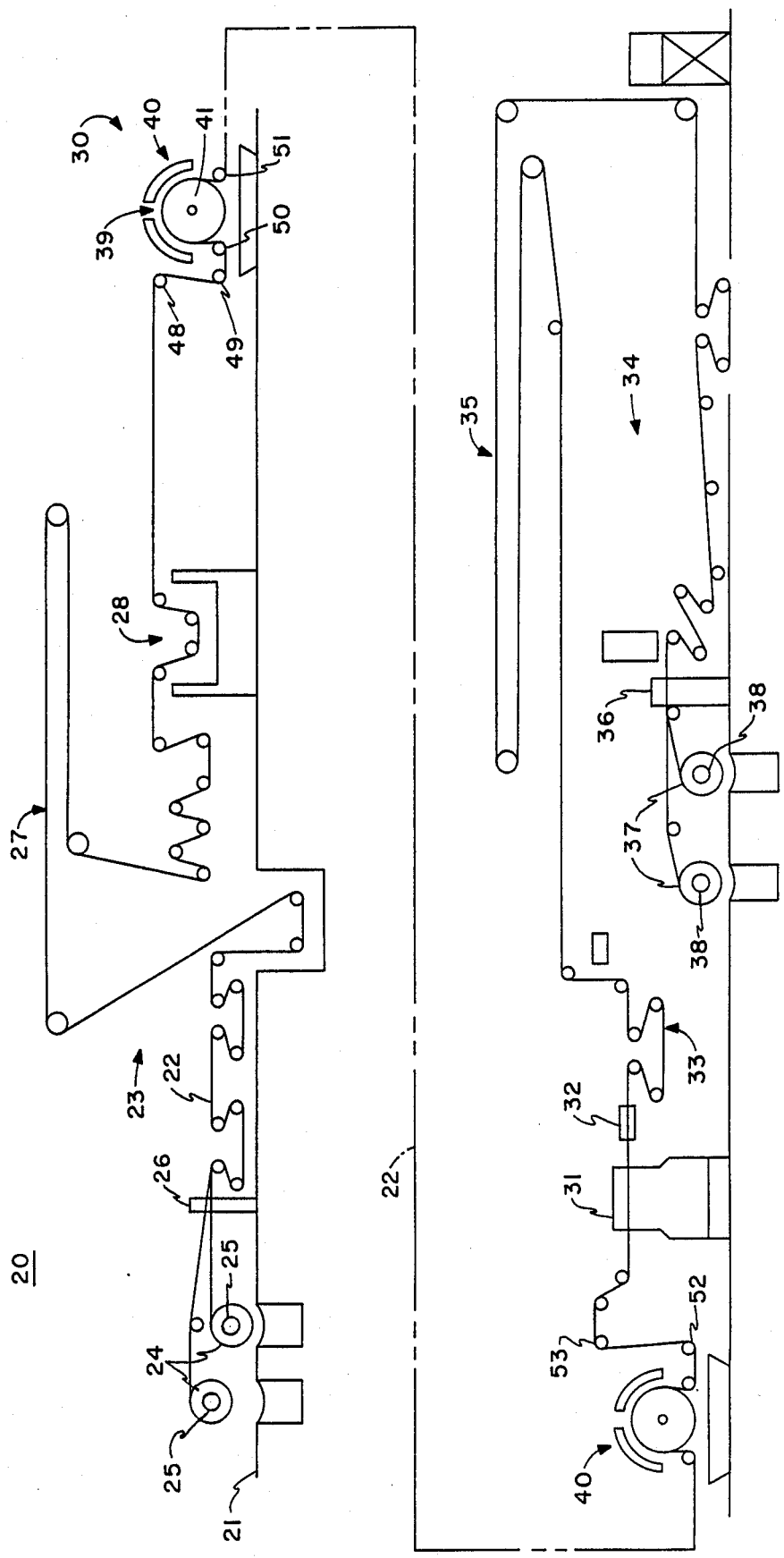
FIG. 1 is a partially diagrammatic, side elevational view of a coil processing installation incorporating two electrochemical machining cells constructed in accordance with and embodying the features of the present invention.
Figure 2:
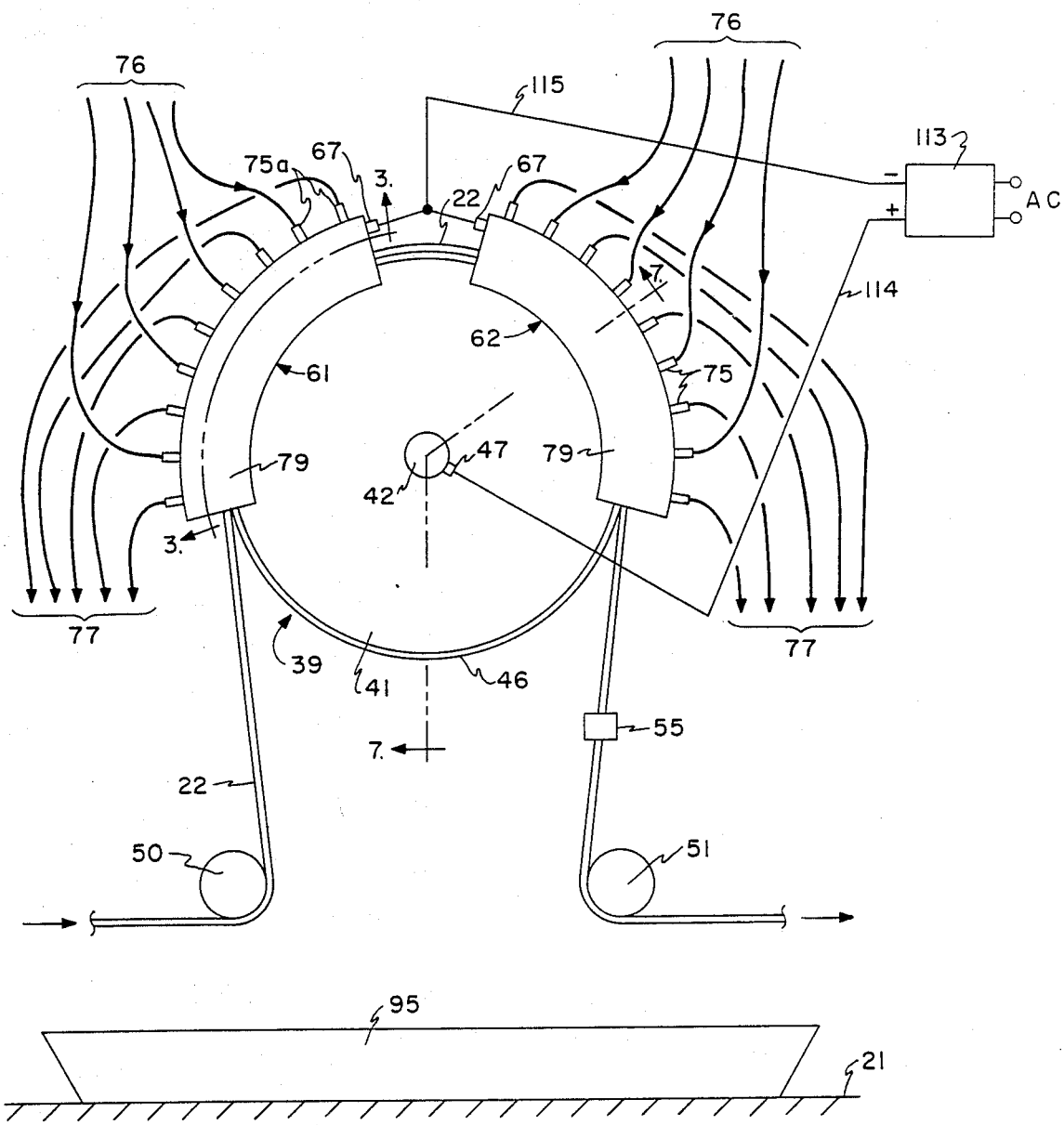
FIG. 2 is an enlarged, fragmentary, side elevational view of one of the electrochemical machining cells of FIG. 1.
Figure 4:
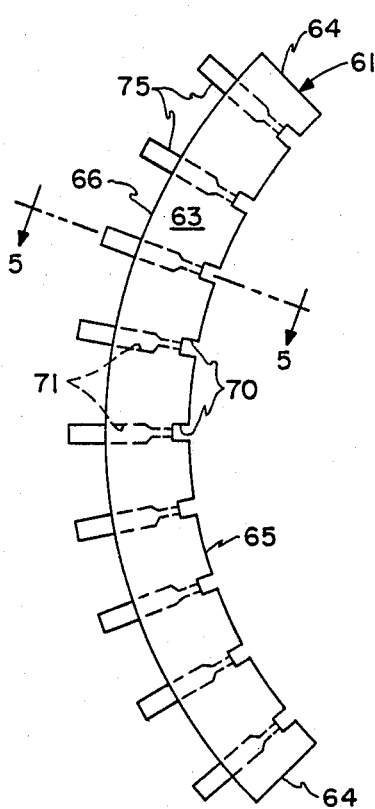
FIG. 4 is an end elevational view of the cathode of FIG. 3, as viewed from the left-end thereof, and with the electrolyte retainer removed.
Figure 3:
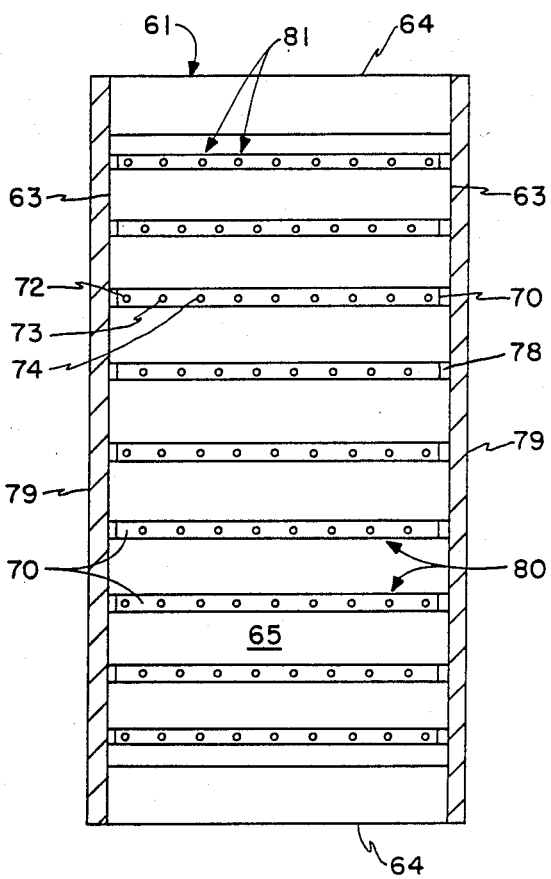
FIG. 3 is a sectional view taken along the line 3—3 in FIG. 2.
Figure 5:
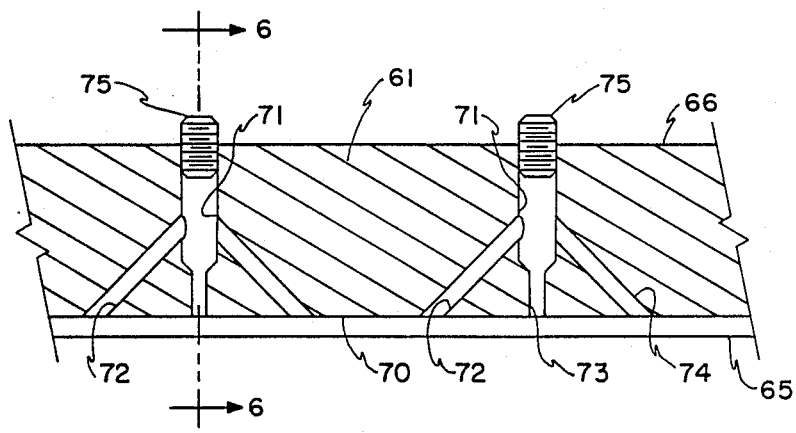
FIG. 5 is a further enlarged, fragmentary, sectional view taken along the line 5—5 in FIG. 4.

Referring to FIG. 1, there is illustrated a typical electrochemical treatment system, generally designated by the numeral 20, adapted for electrochemical machining by the use of the present invention. More particularly, the system 20 has an electrochemical machining ("ECM") section 30 incorporating two ECM cells 40, each constructed in accordance with and embodying the features of the present invention, and disposed in a working region 39. While two of the cells 40 have been illustrated, it will be appreciated that any desired number of cells 40 could be utilized in the system 20, depending upon the amount of material to be removed.

The system 20 is mounted on a floor 21 and operates to process a continuous web 22 of material, such as a continuous metal strip, which is to be processed by the system 20 for reducing the thickness thereof, such as in the formation of metal foils. The system 20 has an entry section 23 in which the web 22 is unreeled from a coil 24 by means of a suitable uncoiler motor 25. While two of the coils 24 are illustrated in FIG. 1, it will be appreciated that only one is used at a time. When one coil 24 is exhausted, the trailing end of the web therefrom is welded to the leading end of the web of the other coil 24 at a welder 26, and the empty reel is then replaced. In this manner, the system 20 can be operated substantially continuously. To facilitate this continuous operation, the entry section 23 includes a looping unit 27 which accumulates a length of the web 22, the system 20 drawing web from this accumulation during the time that a switchover is being made from one supply coil to another, all in a known manner.

As the web 22 leaves the entry section 23 it may be passed through a cleaner 28 to remove surface impurities. The web 22 then enters the ECM section 30, being processed sequentially in the ECM cells 40. Upon exiting the ECM section 30, the web 22 passes through a rinse tank 31 for removing the electrolyte fluid and any remaining loose material, and is then passed through a dryer 32 and a main pulling bridle 33 for drawing the web 22 through the ECM section 30.

The web 22 then passes through an exit section 34, which includes another looping unit 35 to accumulate a length of web 22. The web 22 then passes through a shear mechanism 36 and then onto a tension or take-up reel 37, which is driven by an associated coiler motor 38. It will be appreciated that when a reel 37 is filled, the web is severed at the shear mechanism 36, and the leading end is then fed onto a second take-up reel 37, while the filled reel 37 is removed and replaced with an empty one. During this severing and rethreading operation onto the new take-up reel 37, web from the ECM section is accumulated in the looping unit 35. Thus, continuous operation of the system 20 is facilitated, in a known manner.

Referring now to FIGS. 2 through 7, the ECM cell 40 will be described in detail. The ECM cell 40 includes a large, cylindrical, electrically conductive roller 41, mounted for rotation about the longitudinal axis thereof by stub shafts 42. The roller 41 has an electrically conductive cylindrical outer surface 44, having annular recesses 45 formed therein, respectively at the opposite ends thereof (see FIG. 7) to define reduced-diameter portions. Disposed in each of these recesses 45 is an electrically insulating annular sleeve 46, which may be formed of rubber or other suitable material. The axial length of the roller 41 is designed to correspond with the lateral width of the web 22 being processed. More particularly, the axial distance between the inner edges of the insulating sleeves 46 is preferably slightly less than the lateral width of the web 22, so that the side edges of the web 42 overlap the insulating sleeves 46 a slight distance (e.g. ½ inch). This will ensure that the metallic surface of the roller 41 is not directly exposed to the electrolytic action, but the overlap will be small enough to ensure that the web 22 will be positively charged. Preferably, the cylindrical outer surface 44 of the roller 41 is machined to a constant radius along its entire axial length. It will be appreciated that different size rollers 41 may be utilized for processing different size webs. Accordingly, the roller 41 is preferably mounted in a roll stand (not shown) which is designed to accommodate a quick change of rollers.

The roller 41 is adapted to be coupled, while it is rotating, to a source of electric power, as by slip rings 47 coupled to the stub shafts 42. The web 22 is fed into the ECM cell 40 so as to be wrapped around the roller 41 in electrical contact therewith. More particularly, where the web 20 enters the ECM cell 40 adjacent to the top thereof, it is first fed around guide rollers 48, 49 and 50 (see FIGS. 1 and 2), so that the web 22 may extend upwardly over the top of the roller 41 and then downwardly therefrom, exiting around the guide roller 51. If more than one ECM cell 40 is utilized, the web 22 is passed from the guide roller 51 directly to the guide roller 50 of the next ECM cell 40. In the last ECM cell 40, the web 22, after passing around the guide roller 51, will then be fed around guide rollers 53 and 54 back up to the same level at which it entered the ECM section 30.

Preferably, the ECM cell 40 is designed so that the web 22 will be disposed in contact with the outer surface 44 of the roller 41 around more than 180° of the circumference thereof, it being appreciated that the angular extent of contact can be controlled by the spacing between the guide rollers 50 and 51. As the web 22 exits the roller 41, it passes through a thickness gauge 55, which may be a gamma ray gauge, for a purpose to be explained more fully below. It will be appreciated that use of the insulating sleeves 46 on the roller 41 permits the use of a roller 41 which has an axial dimension greater than the lateral width of the web 22, so as to keep the web 22 properly positioned on the roller 41. For example, on a roller designed to process a 36-inch width web, the width of the roller 41 might be 40 inches, with 2.5 inches of insulating sleeve 46 on each end thereof.

The ECM cell 40 also includes a cathode assembly 60 (see FIG. 8), which comprises two part-cylindrical cathode members 61 and 62, which may be substantially identical in construction. While two cathode members are shown, the cathode assembly 60 would comprise a single cathode member or more than two. Preferably, the combined arcuate extent of the cathode members is not greater than 300°. Each of the cathode members 61 and 62 has parallel planar side walls 63, radially extending planar end walls 64, a part-cylindrical inner working surface 65 and a part-cylindrical outer surface 66, coaxial with the working surface 65 (see FIGS. 3-6). Terminal connections 67 (see FIG. 2) are respectively provided on the cathode members 61 and 62 for connection to an associated source of electric power.

The cathode members 61 and 62 are designed so that, in use, they are disposed substantially coaxially with the conductive roller 41, with the working surfaces 65 arranged on a common cylinder, spaced a predetermined slight distance radially outwardly from the conductive outer surface 44 of the roller 41, this distance being greater than the initial thickness of the web 22. Thus, when the web 22 is wrapped around the roller 41, the cathode assembly 60 cooperates therewith to define therebetween an annular working gap 68 (see FIGS. 6 and 7), which gap may, for example, be in the range of from about 0.02 inch to about 0.04 inch.

There may be formed in the working surface 65 of each of the cathode members 61 and 62 a plurality of laterally extending channels 70, each of which is preferably rectangular in transverse cross section and extends the entire width of the cathode member from one to the other of the side walls 63, the channels 70 preferably being equidistantly spaced apart circumferentially of the cathode member. Extending radially through each cathode member 61 and 62 is a plurality of bores 71, spaced apart longitudinally of each of the channels 70. Each of the bores 71 branches into three ports 72, 73 and 74, which open into the corresponding one of the channels 70 at equidistantly spaced-apart points therealong (see FIG. 5).

Figure 6:
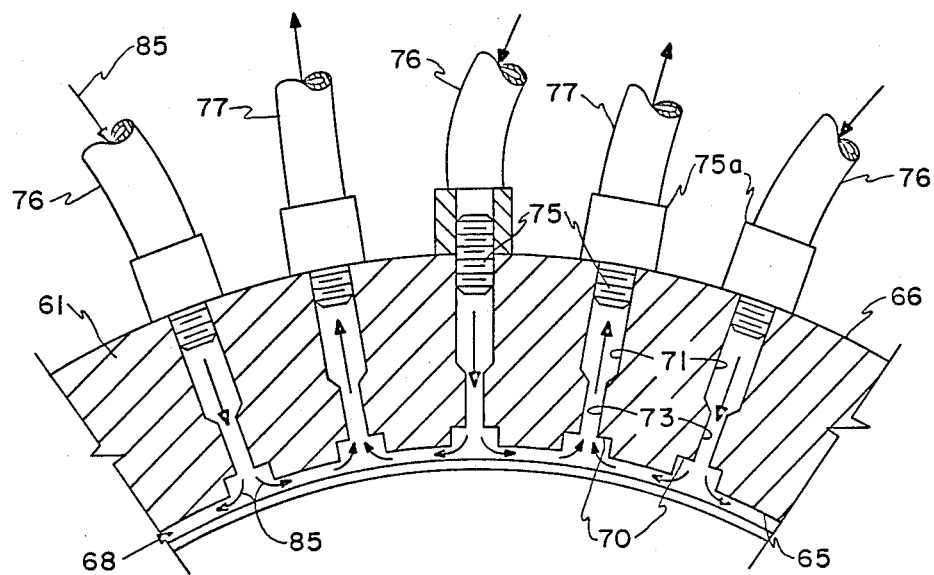
FIG. 6 is a fragmentary sectional view taken along the line 6—6 in FIG. 5.
Figure 7:
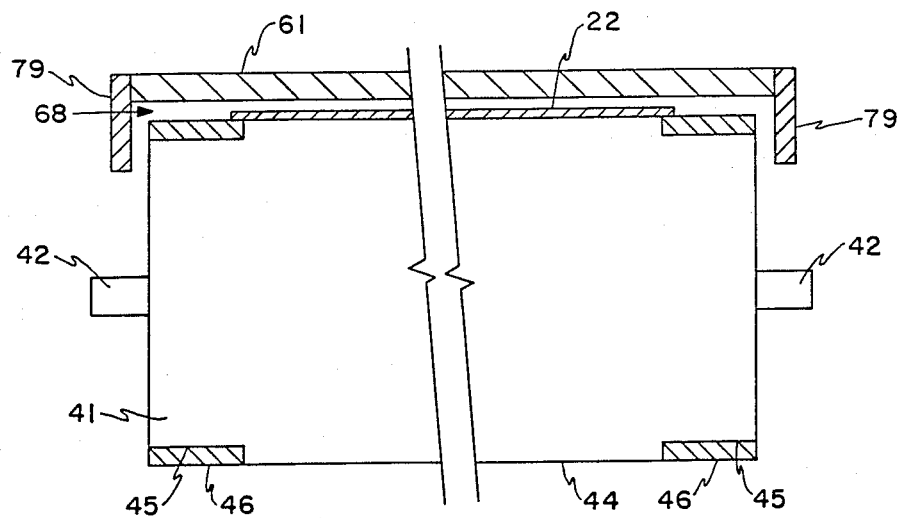
FIG. 7 is a fragmentary view in vertical section taken along the line 7—7 in FIG. 2, with portions broken away.

Threadedly engaged in the outer end of each of the bores 71 is a fitting 75, which projects radially outwardly beyond the outer surface 66 and is adapted to the threadedly engaged with a mating coupling 75a (FIG. 6) on an associated conduit. More particularly, alternate ones of the fittings 75 along each channel 70 are coupled to inlet conduits 76, while the remaining fittings 75 along that channel 70 are coupled to outlet conduits 77. Preferably each cathode member 61 and 62 has an axial extent slightly greater than that of the conductive roller 41 and is provided at each side thereof with an electrically non-conductive retainer plate 79. More particularly, referring to FIGS. 3 and 7, the retainer plates 79 are fixedly secured, respectively, to the side walls 63 of the associated cathode member 61 or 62 and extend radially inwardly well beyond the working surface 65. Thus, as can be seen in FIG. 7, when the cathode assembly 60 is mounted in place in working relationship with the conductive roller 41, the retainer plates 79 respectively extend downwardly and overlap the adjacent ends of the conductive roller 41, providing end walls for the working gap 68.

It can be seen that the ports 72–74 are arranged generally in a rectangular matrix configuration comprised of a plurality of rows 80, aligned respectively with the channels 70, and a plurality of intersecting columns 81, the matrix preferably being arranged so that the ports 72–74 provide uniform coverage of the working gap 68. More particularly, in use, a suitable electrolyte fluid 85, indicated by the arrows 5 in FIG. 6, is introduced from an associated source through the inlet conduits 76, passes through the associated bores 71 and thence through the ports 72–74 into the associated channels 70 and thence to the working gap 68. Preferably, the electrolyte fluid 85 is introduced under substantial pressure, so that it fills the working gap 68 and is disposed in contact with the web 22 and the working surfaces 65 of the cathode assembly 60 over the full lateral and circumferential extent of the working gap 68. The bulk of the electrolyte fluid 85 then flows upwardly through the ports 72–74 associated with the outlet conduits 77 and thence through those outlet conduits 77 to the associated source or a reservoir, as will be explained more fully below.

Because the working gap 68 must at all times be maintained between the cathode assembly 60 and the web 22, some of the electrolyte fluid 85 will escape. Indeed, because of the high pressure of the electrolyte fluid 85, it will tend to escape at the open sides and ends of the cathode members 61 and 62 at a relatively high velocity. As will be explained below, fluid escaping the ends of the cathode members 61 and 62 will be directed toward collection means. It will be appreciated that the retainer plates 79 prevent ejection of the electrolyte fluid 85 from the working region 39 in directions axially of the conductive roller 41. Upon striking the retainer plates 79, the electrolyte fluid will fall downwardly by gravity to an associated collector, as will be explained below. The ends of the channels 70 may be plugged, as at 78, to prevent fluid from flowing therefrom.

Figure 9:
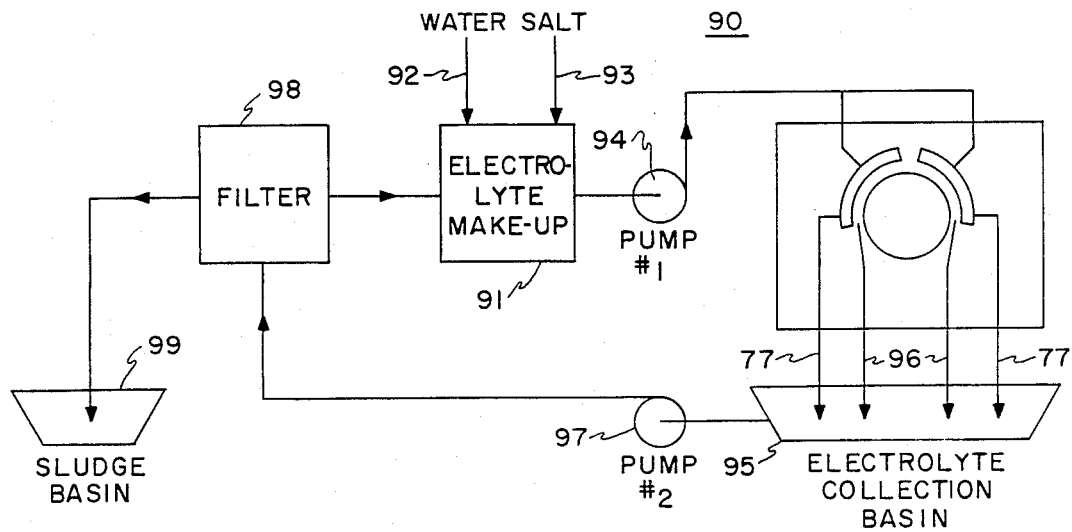
FIG. 9 is a block circuit diagram of the hydraulic circuit for the electrolyte fluid of the electrochemical machining apparatus of FIG. 1.

Referring now to FIG. 9, there is illustrated a hydraulic system 90 for controlling the flow of electrolyte fluid 85 through the ECM cell 40. The electrolyte fluid 85 may be of any of a number of different types, depending upon the metal being processed. In the case of processing a titanium web 22, the electrolyte fluid 85 is preferably an 18% aqueous solution of sodium chloride. The electrolyte fluid 85 is formulated in a make-up chamber 91 provided with a water inlet port 92 and a salt inlet port 93. Electrolyte fluid is pumped from the make-up chamber 91 to the inlet conduits 76 of the ECM cell 40 by a pump 94. Preferably, the pressure of the electrolyte fluid 85 will be in the range of from about 10 atmospheres to about 20 atmospheres across the working surfaces 65 of the cathode assembly 60. The outlet conduits 77 which receive electrolyte fluid from the working gap 68 carry it to a collection basin 95 disposed beneath the conductive roller 41, and into which also falls the portion of the electrolyte fluid 85 which drops by gravity from the ECM cell 40, as indicated by the arrows 96 in FIG. 9.

The electrolyte fluid 85 which leaves the ECM cell 40 carries with it solid material resulting from the machining of the web 22. This mixture is pumped from the collection basin 95 by a pump 97 to a filter 98, which removes the solids in the electrolyte fluid 85. Typically, the solid material will be mainly in the form of hydroxides and oxides of the metal machined from the web 22. The filtered electrolyte is returned to the make-up chamber 91, while the solids are delivered to a sludge basin 99 for disposal. It will be appreciated that the pump 94 may deliver electrolyte fluid 85 to all of the ECM cells 40 in the ECM section 30, where more than one such cell is utilized. Similarly, it will be appreciated that the collection basin 95 may receive electrolyte fluid 85 from all of the ECM cells 40 in the ECM section 30.

Figure 8:
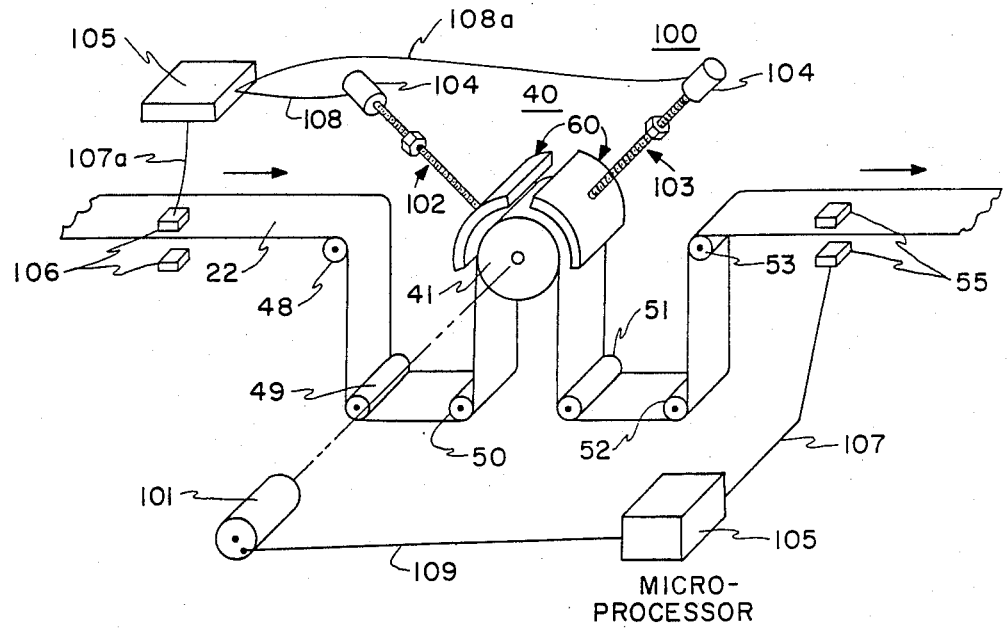
FIG. 8 is a diagrammatic perspective view illustrating the control of the web transport mechanism of the present invention.

Referring now to FIG. 8, there is illustrated a speed control system 100, for controlling the speed of travel of the web 22 through the ECM cell 40. The conductive roller 41 is positively driven by an anode motor 101, which is preferably a variable speed DC motor. The cathode members 61 and 62 of the cathode assembly 60 may, respectively, be coupled to jack screw assemblies 102 and 103, each of which is provided with a drive motor 104. The system 100 operates under control of a microprocessor 105. While two blocks 105 are shown for ease of illustration, it will be appreciated that they may represent a single microprocessor. An additional thickness gauge 106, which may be the same type as the thickness gauge 55, may be provided at the input to the ECM cell 40. The thickness gauges 55 and 106, are respectively, coupled by conductors 107 and 107a to the microprocessor 105, which is, in turn, coupled by conductors 108 and 108(a) to the drive motors 104 of the jack screw assemblies 102 and 103, and by a conductor 109 to the anode 101.

In operation, for a given voltage differential across the working gap 68, the rate of material removal from the web 22 is determined by the dimension of the working gap 68, the pressure of the electrolyte fluid 85 and the length of time that any particular part of the web 22 remains in the electrolysis zone of the ECM cell 40 working region 39. This latter parameter is, in turn, a function of the speed of transport of the web 22 through the ECM cell 40. The initial thickness measurement of the web 22 from the gauge 106 is fed to the microprocessor 105 which, in turn, controls the setting of the jack screw assemblies 102 and 103 to determine the position of the cathode assembly 60 and, thereby, the dimension of the working gap 68. The thickness of the web 22 is again measured by the gauge 55 as it leaves the ECM cell 40. The microprocessor 105 compares this measured thickness with the desired thickness and sends a signal to the anode motor 101 to speed it up or slow it down, as required. When multiple ECM cells are used, it is necessary to drive the web 22 at the same linear speed through each of the ECM cells in order to avoid tension or slack in the web 22. This can be accomplished by controlling the speed of all of the anode motors 101 by electrical interconnection of the microprocessor 105 of the last ECM cell with the anode motors 101 of the other ECM cells.

It will be appreciated that, where multiple ECM cells 40 are utilized in the ECM section 30, the measurement gauge 55 on the exit side of the ECM cell 40 can also be used to adjust the working gap setting for the next cell, as well as to control the web speed. This gap control feature is particularly useful where the system 20 is run continuously with multiple coils, since the web thickness may vary from coil to coil.

Figure 10:
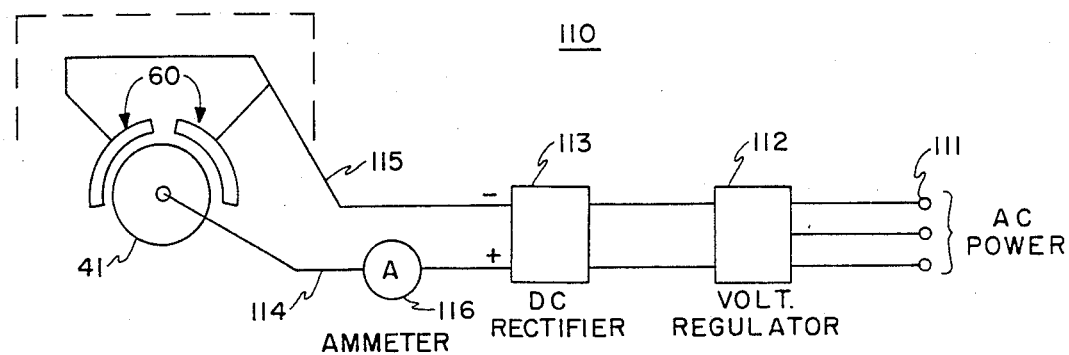
FIG. 10 is a partially schematic and partially block diagram illustrating the DC electrochemical machining circuit of the present invention.

Referring now to FIG. 10, there is illustrated an electrolytic control system 110, for controlling the electrolysis reaction. AC power, such as 3-phase, 60 Hz, 440 volt power, is applied from a suitable source, designated by terminals 111, to a voltage regulator 112. The output of the voltage regulator 112 is applied to a DC rectifier 113 which produces DC power at its output in the range of 7 to 25 volts. The output terminals of the DC rectifier 113 are, respectively, connected by the conductors 114 and 115, to the conductive roller 41 and the cathode assembly 60. If desired an ammeter 116 may be connected in the conductor 114.

The electrolytic reaction during the machining process consists of the removal of electrons from the web 22, and supply of these electrons to the cathode members 61 and 62 by the aid of the direct power source. The electrolyte fluid 85 will preferentially electrolyze the water rather than the sodium chloride. The results of the reaction will be hydrogen gas produced at the cathode members 61 and 62 and a titanium hydroxide or titanium oxide produced at the anode (the web 22). The production of hydrogen sould be in the approximate ratio of ½ mole per mole of titanium metal removed from the web 22. In normal ECM practice this hydrogen gas is merely vented into the building and allowed to escape through a roof vent. The hydrogen may largely be in the electrolyte fluid removed from the ECM cell 40, in which case this gas could readily be selectively vented. The spent electrolyte fluid is essentially salt water.

In operation, the conductive roller 41 is positively charged. The roller 41 moves the web 22 uniformly past the cathode assembly 60, as the roller 41 rotates. The charge on the roller 41 is conducted to the web 22, which is held firmly in contact with the conductive surface 44 of the roller 41 by tension in the web 22 and by the hydraulic pressure of the electrolyte fluid 85. As indicated above, the thickness gauge 106 measures the thickness of the web 22 as it enters the ECM cell 40, and in response to this measurement, the microprocessor 105 controls the positioning of the cathode members 61 and 62 for setting the working gap 68 at the desired dimension for the amount of material removal desired.

The overall speed of web 22 through the system 20 will be nominally set to provide the desired rate of material removal for the predetermined working gap 68. The thickness gauge 55 again measures the thickness of the web 22 as it exits the ECM cell 40, the microprocessor 105 utilizing this measurement to compare the thickness to the predetermined desired finished thickness. If the thickness is too great, the anode motor 101 is controlled to slow down the speed of rotation of the roller 41, to increase the amount of time that the web remains in the working region 39 and, thereby, the amount of material removed. Correspondingly, if the thickness is too small, the speed of rotation of the roller 41 is increased to lessen the amount of material removed. It will be appreciated that the uncoiler motors 25 and the coiler motors 38 will operate at variable speeds so as to provide a uniform flow of web to and from the ECM cell 40 as called for by the speed of rotation of the conductive roller 41.

A significant aspect of the present invention is that the flow of current between the cathode assembly 60 and the web 22 is dependent upon the conductance of the electrolyte fluid 85, which is inversely proportional to the working gap 68 between the cathode assembly 60 and the web 22. Thus, it will be appreciated that the method and apparatus of the present invention are inherently biased to "flatten" crowned strip material. Such crowning, i.e. the web being thicker at the center than at the edges, usually occurs in wide strips due to roll bending. Conversely, it will be appreciated that the present invention is inherently biased so as not to attack "thin" spots in the web 22.

Another feature of the invention is that the process can be easily controlled with a minimum amount of web in the ECM cell 40 at any one time. Furthermore, the process can be stopped without damaging the web 22 to repair equipment or to respond to power failures, and the like, by merely cutting the power supply to the ECM cell 40.

It will be appreciated that the present invention permits accurate maintenance of a very narrow working gap 68, which permits a high current flow. Furthermore, the flow of electrolyte fluid 85 under high pressure through the working gap 68, in addition to flushing away material removed from the web 22, gives a scrubbing action to the web 22 which helps prevent pitting. The high current flow and the pressurized flow of electrolyte fluid both contribute to high production rates and uniformity of machining.

In the event that only one coil of web material 22 is run at a time, it may be desirable to utilize a lower cost web material, such as carbon steel, and attach it to the web 22 being processed as a leader/trailer. This carbon steel web could be left threaded through the system 20 at the completion of processing of a coil of material, and could be attached to the new coil to get it threaded through the system 20. This would significantly reduce the manpower costs attendant upon rethreading new coils of material into the system 20.

Figure 11:
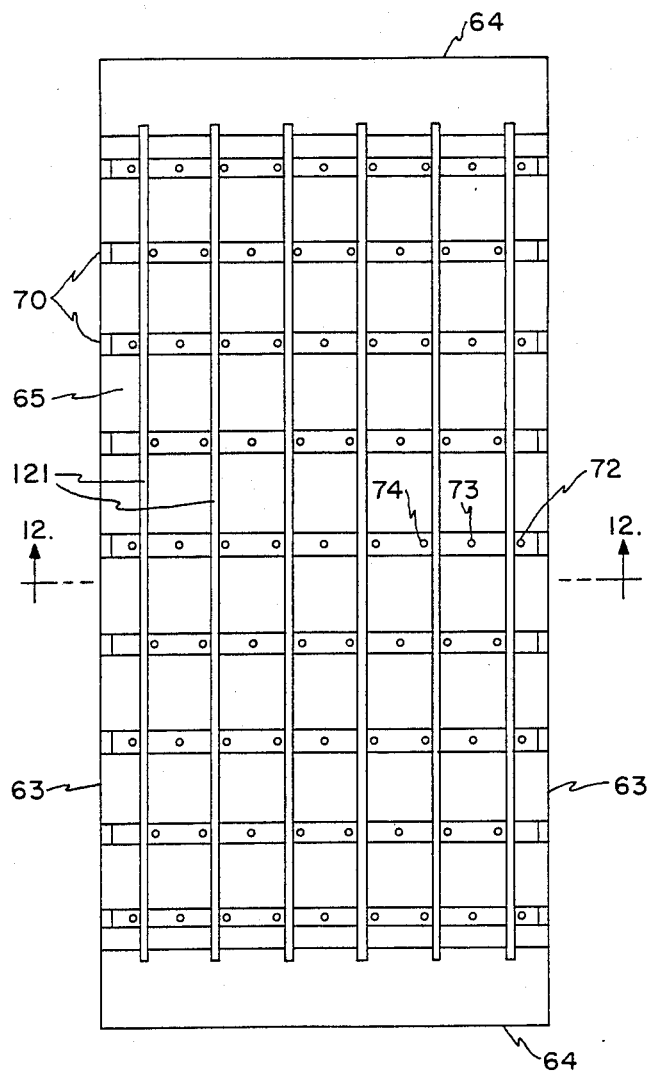
FIG. 11 is an enlarged view, similar to FIG. 3, illustrating an alternative embodiment of the cathode of the present invention.
Figure 12:
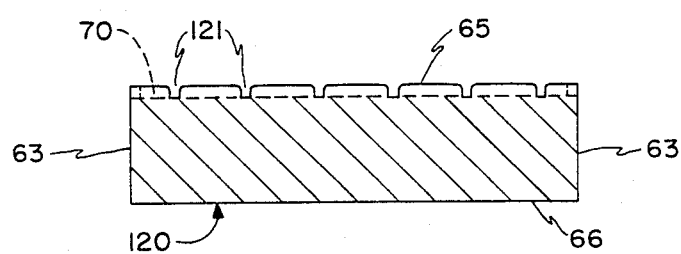
FIG. 12 is a view in vertical section taken along the line 12—12 in FIG. 11.

Referring now to FIGS. 11 and 12, there is disclosed an alternative form of cathode member, generally designated by the numeral 120, which can be substituted for the cathode members 61 and 62 of the cathode assembly 60. The cathode member 120 is a curved, part-cylindrical member, substantially the same in construction as the cathode members 61 and 62, except that it additionally includes a plurality of substantially equidistantly, laterally spaced-apart grooves 121 formed in the working surface 65 and extending circumferentially thereof along the entire length thereof. The grooves 121 are of sufficient depth to prevent electrical conduction between the web and the groove area, and preferably have radiused edges at their interface with the working surface 65. If desired, elongated strips of electrically nonconductive material could be laid in the grooves 121.

Figure 13:
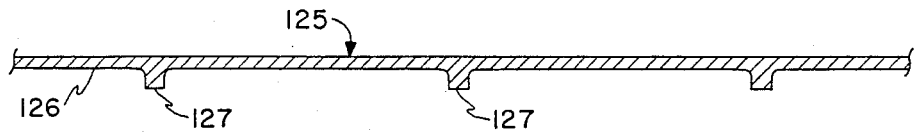
FIG. 13 is a fragmentary side elevational view of a web of material after electrochemical machining utilizing the cathode structure of FIG. 11.

It will be appreciated that, in use, the grooves 121 extend parallel to the direction of movement of the web 22 through the ECM cell 40. Because the bottoms of the grooves 121 are spaced farther from the web than the working surface 65, the current will flow preferentially in the areas covered by the working surface 65. Accordingly, material will not be removed from the web 22 in the areas of the grooves 121. Referring to FIG. 13, this results in a ribbed web 125, which is machined to a reduced thickness, as at 126, over the entire area of the web, except for those regions under the grooves 121, resulting in longitudinal ribs 127, which have a thickness corresponding approximately to the original unmachined thickness of the web. The presence of the ribs 122 serves to give the web 125 strength and rigidity which approaches that of the original web before machining, but at a significant reduction in weight. This can be particularly advantageous in combining lengths of the ribbed web 125 to form panels.

Figure 14:
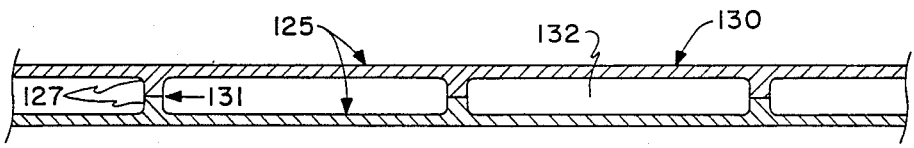
FIG. 14 is a fragmentary side elevational view of a first panel configuration which can be formed with the ribbed sheet of 13.
Figure 15:
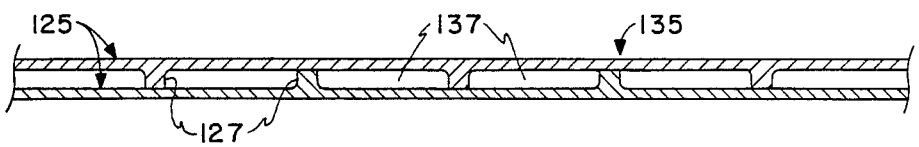
FIG. 15 is a view similar to FIG. 14, showing another panel configuration which can be formed with the ribbed web of FIG. 13.
Figure 16:
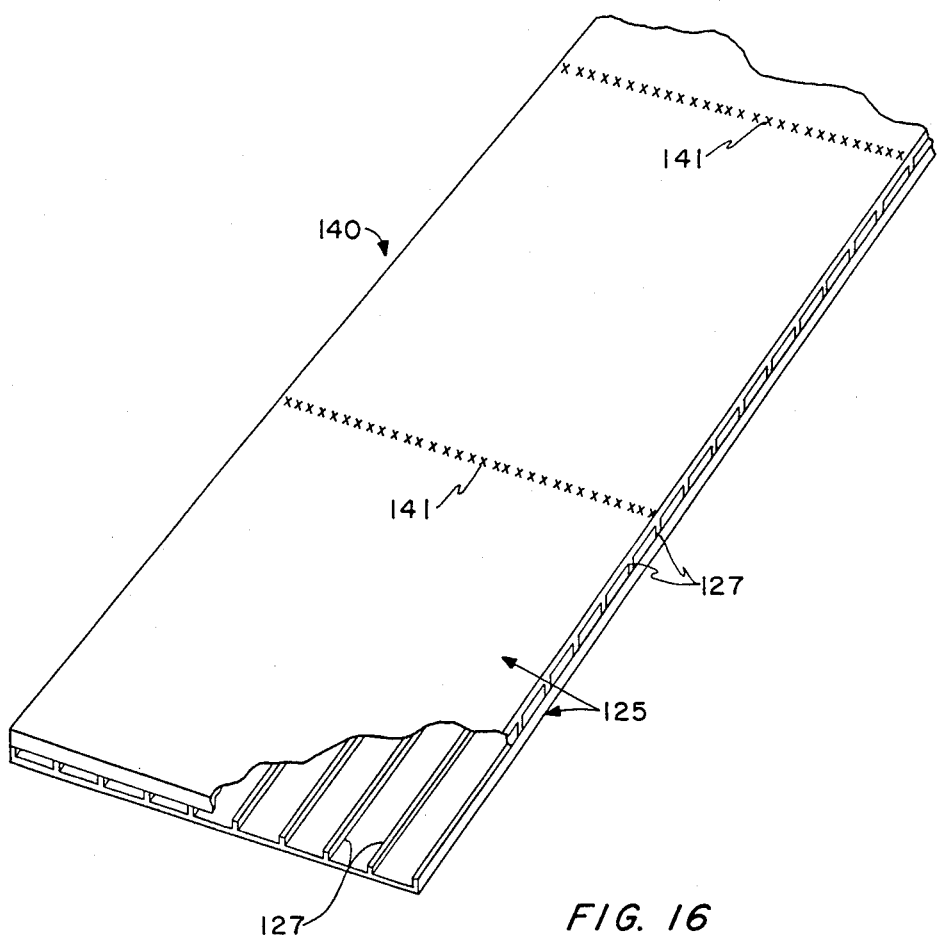
FIG. 16 is a fragmentary perspective view of still another type of panel configuration which can be formed with the ribbed web of FIG. 13.

Examples of these panel constructions are illustrated in FIGS. 14–16. In FIG. 14, if it is assumed that the original web 125 was 3/16 inch thick, and it is machined to a thickness of 1/16 inch at the areas 126, and if it is further assumed that the ribs 127 are ⅛ inch wide and spaced on 2 inch centers, the resulting ribbed web 125 has a weight which is only 38% of the original weight of the web. If two layers of the web 125 are overlaid with the ribs 127 thereof butting together and diffusion welded, as illustrated in FIG. 14, there results a panel 130 which has an overall thickness of ⅜ inch. The butted ribs 127 form butt joints 131 which act as miniature I-beams, separated by open spaces 132. The panel 130 has a weight only 38% of the weight of a solid ⅜ inch panel, but has substantially the same strength.

Another version of panel 135 is illustrated in FIG. 15, and is formed by overlapping two layers of the ribbed web 125, with the ribs 127 of one layer disposed in staggered relationship with those of the other layer. There results a ¼ inch panel 135 having open spaces 137. This arrangement gives greater support to the skin of the panel 135, at the same spacing of the ribs 127.

Another version of panel, generally designated 140, is illustrated in FIG. 16. This type of panel is formed by arranging the two layers of web 125 at angles of 90° to each other, so that the ribs 127 of the two layers of web 125 crisscross perpendicular to each other. The ribs 127 may be diffusion welded at their intersections, and the lengths of the top layer of web 125 may be butt welded, as at 141. This results in a checkerboard rib structure which is useful for obtaining rigidity in both longitudinal and lateral directions.

It will be appreciated that, depending on the desired application, the grooves 121 in the cathode member 120 may be of any desired width and spaced apart any desired distance, depending upon the particular configuration of ribbed web desired.

From the foregoing, it can be seen that there have been provided an improved electrochemical machining method and apparatus for performing same, which permit the continuous electrochemical machining of a metal web, can be readily scaled up to large commercial production sizes, can be easily stopped without damaging the web, require relatively low investment cost and minimal floor space, and permit high production rates, all while permitting the electrochemical machining of metals, such as titanium, which are difficult or impossible to machine by other known techniques.

I claim:

1. Apparatus for continuous electrochemical machining of a metal web comprising: transport means for continuously moving the web through a working region, first electrode means disposed at the working region a predetermined distance from the portion of the web disposed in the working region so as to establish a predetermined working gap between said first electrode means and a predetermined working area of the portion of the web disposed in the working region which extends over substantially the full width of the web, means for continuously flowing an electrolyte fluid through the working gap in contact with said first electrode means and with the portion of the web disposed in the working region at a pressure substantially greater than atmospheric pressure, second electrode means disposed in electrical and rigid supporting contact with the sheet over a predetermined contact area thereof which completely overlaps said working area, and coupling means for connecting a source of electric current to said first and second electrode means for promoting a flow of current through the web and the electrolyte and said first and second electrode means to effect electrochemical removal of material from the portion of the web disposed in the working region.

2. The apparatus of claim 1, wherein said transport means includes means for continuously moving the web longitudinally through the working region.

3. The apparatus of claim 2, wherein said electrode means includes a plurality of laterally alternating and longitudinally extending conductive and non-conductive portions facing the web so that material is removed from the web in laterally spaced-apart rows.

4. The apparatus of claim 1, wherein said transport means includes means for varying the rate of movement of the web through the working region.

5. The apparatus of claim 4, and further comprising gauge means for measuring the thickness of the web as it exits the working region, and control means coupled to said gauge means and said transport means for varying the rate of movement of the web through the working region as a function of the web thickness as measured by said gauge means.

6. The apparatus of claim 1, wherein said transport means includes means for moving the web along an arcuate path through the working region.

7. The apparatus of claim 1, wherein said coupling means is adapted for connection to an associated source of DC power with the web connected to the positive terminal of the source and the cathode means connected to the negative terminal of the source.

8. The apparatus of claim 1, and further comprising means for controlling the size of the working gap.

9. The apparatus of claim 1, and further including means for recirculating the electrolyte fluid through the working gap.

10. Apparatus for continuous electrochemical machining of a metal web comprising: an electrically conductive cylindrical roller rotatably mounted in a working region, transport means for continuously moving the web through the working region and in electrical contact with said roller around a predetermined portion of the circumference thereof, part-cylindrical cathode means disposed coaxially with said roller and spaced a predetermined slight distance radially outwardly therefrom so as to define a working gap between said cathode means and the portion of the web disposed in electrical contact with said roller, means for continuously flowing an electrolyte fluid through the working gap in contact with said cathode means and with the portion of the web disposed in electrical contact with said roller, and coupling means for electrically connecting said roller and said cathode means respectively to the positive and negative terminals of an associated source of DC power for promoting a flow of direct current through said cathode means and said electrolyte fluid and the portion of the web disposed in electrical contact with said roller to effect electrochemical removal of material from the portion of the web disposed in electrical contact with said roller.

11. The apparatus of claim 10, wherein said cylindrical roller is disposed in driving contact with the web for effecting longitudinal movement thereof through the working region.

12. The apparatus of claim 11, wherein said transport means includes means for varying the speed of movement of the web through the working region.

13. The apparatus of claim 12, and further comprising gauge means for measuring the thickness of the web as it exits the working region, and control means coupled to said gauge means and said transport means for varying the rate of movement of the web thickness as measured by said gauge means.

14. The apparatus of claim 10, wherein said cathode means includes two part-cylindrical cathode members connected in parallel to the negative terminal of the associated source of DC power, the total angular extent of said cathode members being not greater than about 300°.

15. The apparatus of claim 10, wherein said roller has an axial extent greater than the lateral width of the web.

16. The apparatus of claim 15, wherein said roller has two annular electrically insulating sleeves respectively disposed at the opposite ends thereof and axially spaced apart a distance slightly less than the lateral width of the web.

17. The apparatus of claim 10, wherein the axis of rotation of said roller is disposed substantially horizontally.

18. Apparatus for continuous electrochemical machining of a metal web comprising: an electrically conductive cylindrical roller rotatably mounted in a working region, transport means for continuously moving the web through the working region and in electrical contact with said roller around a predetermined portion of the circumference thereof, part-cylindrical cathode means disposed coaxially with said roller and spaced a predetermined slight distance radially outwardly therefrom so as to define a working gap between said cathode means and the portion of the web disposed in electrical contact with said roller, a plurality of spaced-apart bores extending radially through said cathode means, a source of electrolyte fluid, input conduit means coupled to selected ones of said bores and to said source of electrolyte fluid for injecting said fluid into the working gap, a plurality of outlet conduit means coupled to the remaining ones of said bores and to said source for removing electrolyte fluid from the gap and returning it to said source, and coupling means for electrically connecting said roller and said cathode means respectively to the positive and negative terminals of an associated source of DC power for promoting a flow of direct current through said cathode means and said electrolyte fluid and the portion of the web disposed in electrical contact with said roller to effect electrochemical removal of material from the portion of the web disposed in electrical contact with said roller.

19. The apparatus of claim 18, and further comprising pressurizing means for injecting said electrolyte fluid into the working gap under a pressure substantially higher than atmospheric pressure.

20. The apparatus of claim 19, and further comprising retaining means respectively disposed at the opposite ends of said working gap for laterally confining electrolyte fluid emitted from the gap.

21. The apparatus of claim 18, wherein said bores in said cathode means are arranged in axial rows spaced apart circumferentially of said cathode means and circumferential columns spaced apart axially of said cathode means, said input conduit means being coupled to alternate ones of said bores in each row and each column.

22. The apparatus of claim 18, and further comprising collection reservoir means disposed beneath the working region for collecting electrolyte fluid which falls by gravity from the working region.

23. The apparatus of claim 18, wherein said cathode means includes two part-cylindrical cathode members connected in parallel to the negative terminal of the associated source of DC power, the total angular extent of said cathode members being approximately 180°.

24. The apparatus of claim 18, wherein said cathode means has a plurality of laterally-extending channels formed therein facing the working gap, said bores being arranged to communicate with said channels.

25. The apparatus of claim 24, wherein each of said bores is provided with a plurality of diverging outlet ports communicating with the associated channel at spaced-apart locations therealong.

26. The apparatus of claim 18, wherein said cathode means includes a working surface facing the working gap, and a plurality of circumferentially extending and laterally spaced apart grooves in said working surface of sufficient depth to inhibit removal of material from the portions of the web facing said grooves and thereby leave longitudinal ribs in the machined web.

27. A method for continuous electrochemical machining of a metal web comprising the steps of: moving the web continuously through a working region, disposing a first electrode at the working region a predetermined distance from the portion of the web disposed in the working region so as to establish a working gap between the first electrode and a predetermined working area of the portion of the web disposed in the working region which extends over substantially the full width of the web, continuously flowing an electrolyte fluid through the working gap in contact with the first electrode and with the portion of the web disposed in the working region at a pressure substantially greater than atmospheric pressure, disposing a second electrode in electrical and rigid supporting contact with the sheet over a predetermined contact area thereof which completely overlaps said working area, and applying a negative electrical potential to the first electrode and a positive electrical potential to the second electrode for promoting a flow of direct current through the first and second electrodes and the electrolyte fluid and the portion of the web disposed in the working region to effect electrochemical removal of material from the portion of the web disposed in the working region.

28. The method of claim 27, wherein the web is moved longitudinally along an arcuate path through the working region.

29. The method of claim 27, wherein the electrolyte fluid is recirculated through the working gap.

30. The method of claim 27, and further comprising the step of preventing current flow at laterally spaced-apart and longitudinally extending regions of the electrode, thereby to produce longitudinal ribs in the machined web.

31. The method of claim 27, and further comprising the step of varying the speed of movement of the web through the working region as a function of the thickness of the machined web.

32. The method of claim 27, and further comprising the step of varying the size of the working gap as a function of the thickness of the web entering the working region.

33. Apparatus for electrochemical machining of a surface of a metal sheet having a predetermined width, said apparatus comprising: means for supporting the sheet at a working region, first electrode means disposed at the working region a predetermined distance from the sheet in facing relationship with the surface thereof so as to establish a predetermined working gap between said first electrode means and a predetermined working area of the sheet which extends over substantially the entire width of the sheet, transport means for establishing relative movement between said first electrode means and the sheet longitudinally of the sheet, means for continuously flowing an electrolyte fluid through the working gap in contact with said first electrode means and with the sheet at a pressure substantially greater than atmospheric pressure, said means for supporting including second electrode means disposed in electrical and rigid supporting contact with the sheet over a predetermined contact area thereof which completely overlaps said working area, and coupling means for connecting a source of electric current to said first and second electrode means for promoting a flow of current through the sheet and the electrolyte and said first and second electrode means to effect electrochemical removal of material from the surface of the sheet.

34. A method for electrochemical machining of a surface of a metal sheet having a predetermined width, said method comprising the steps of: supporting the sheet at a working region, disposing a first electrode at the working region a predetermined distance from the sheet in facing relationship with the surface thereof so as to establish a predetermined working gap between the first electrode and a predetermined working area of the sheet which extends over substantially the full width of the sheet, establishing relative movement between the first electrode and the sheet longitudinally of the sheet, continuously flowing an electrolyte fluid through the working gap in contact with the first electrode and with the sheet at a pressure substantially greater than atmospheric pressure, disposing a second electrode in electrical and rigid supporting contact with the sheet over a predetermined contact area thereof which completely overlaps said working area, and applying a negative electrical potential to the first electrode and a positive electrical potential to the second electrode for promoting the flow of direct current through the first and second electrodes and the electrolyte fluid and the sheet to effect electrochemical removal of material from the surface of the sheet.

* * * * *

UNITED STATES PATENT AND TRADEMARK OFFICE
CERTIFICATE OF CORRECTION

PATENT NO. : 4,820,390
DATED : April 11, 1989
INVENTOR(S) : John E. Schuster

It is certified that error appears in the above-identified patent and that said Letters Patent is hereby corrected as shown below:

Claim 13, column 12, line 43, after the word "web", add --through the working region as a function of the web--.

Signed and Sealed this

Thirtieth Day of April, 1991

Attest:

HARRY F. MANBECK, JR.

Attesting Officer

Commissioner of Patents and Trademarks